US009031777B2

(12) United States Patent
Cubillo (10) Patent No.: US 9,031,777 B2
(45) Date of Patent: May 12, 2015

(54) DRIVING DIRECTIONS WITH SELECTIVE PRINTING

(75) Inventor: Pedro Antonio Cubillo, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1765 days.

(21) Appl. No.: 11/500,604

(22) Filed: Aug. 8, 2006

(65) Prior Publication Data

US 2008/0037730 A1 Feb. 14, 2008

(51) Int. Cl.
*G01C 21/00* (2006.01)
*G01C 21/32* (2006.01)
*G08G 1/123* (2006.01)
*G06Q 10/10* (2012.01)
*G06Q 50/30* (2012.01)

(52) U.S. Cl.
CPC ............... *G01C 21/00* (2013.01); *G06Q 10/10* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 4,881,179 A * | 11/1989 | Vincent | 358/1.14 |
| 5,212,477 A | 5/1993 | Indekeu et al. | |
| 5,559,707 A | 9/1996 | DeLorme et al. | |
| 5,563,996 A * | 10/1996 | Tchao | 715/201 |
| 5,878,368 A * | 3/1999 | DeGraaf | 701/411 |
| 5,911,773 A * | 6/1999 | Mutsuga et al. | 701/414 |
| 5,944,769 A | 8/1999 | Musk et al. | |
| 5,948,040 A | 9/1999 | DeLorme et al. | |
| 6,040,824 A | 3/2000 | Maekawa et al. | |
| 6,064,941 A | 5/2000 | Nimura et al. | |
| 6,076,041 A | 6/2000 | Watanabe | |
| 6,078,865 A | 6/2000 | Koyanagi | |
| 6,144,318 A | 11/2000 | Hayashi et al. | |
| 6,144,389 A | 11/2000 | Toshimoto et al. | |
| 6,169,552 B1 | 1/2001 | Endo et al. | |
| 6,256,581 B1 | 7/2001 | Fujii et al. | |
| 6,282,493 B1 * | 8/2001 | Kitagawa et al. | 701/438 |

(Continued)

FOREIGN PATENT DOCUMENTS

| | | |
|---|---|---|
| JP | 2000-298026 | 10/2000 |
| JP | 2003-269987 | 9/2003 |

OTHER PUBLICATIONS

"Take the Power of the Google Maps With You on Your Mobile Phone", Google Maps Beta, downloaded Sep. 7, 2006, http://www.google.com/gmm/index.html?utm_source=us-ha-aws&utm_campaign=utm_medium=cpc&utmterm=google . . . .

(Continued)

*Primary Examiner* — Nicholas Kiswanto (57) ABSTRACT

In one of many possible embodiments, an exemplary system includes a driving directions subsystem configured to provide data representative of driving directions to an access device communicatively coupled to the driving directions subsystem. The driving directions subsystem is further configured to provide at least one selection tool to the access device. The selection tool enables a user of the access device to select a subset of the driving directions for printing. In certain embodiments, the driving directions include a plurality of driving steps, and the selection tool enables the user of the access device to select, for each driving step, between including the driving step in and omitting the driving step from the printing.

18 Claims, 5 Drawing Sheets

(56) References Cited

U.S. PATENT DOCUMENTS

| | | | |
|---|---|---|---|
| 6,321,158 B1 | 11/2001 | DeLorme et al. | |
| 6,339,746 B1 | 1/2002 | Sugiyama et al. | |
| 6,405,123 B1 * | 6/2002 | Rennard et al. | 701/410 |
| 6,427,118 B1 | 7/2002 | Suzuki | |
| 6,442,478 B2 | 8/2002 | Hamada et al. | |
| 6,452,597 B1 | 9/2002 | Goldberg et al. | |
| 6,477,460 B2 | 11/2002 | Kepler | |
| 6,480,786 B2 | 11/2002 | Watanabe et al. | |
| 6,509,974 B1 * | 1/2003 | Hansen | 358/1.12 |
| 6,510,379 B1 | 1/2003 | Hasegawa et al. | |
| 6,542,812 B1 | 4/2003 | Obradovich et al. | |
| 6,671,619 B2 | 12/2003 | Kusano et al. | |
| 6,694,252 B2 | 2/2004 | Ukita | |
| 6,765,998 B2 | 7/2004 | Bruce et al. | |
| 6,789,065 B2 | 9/2004 | Berner et al. | |
| 6,836,728 B2 | 12/2004 | Shimabara et al. | |
| 6,948,125 B2 * | 9/2005 | Detweiler et al. | 715/713 |
| 6,950,744 B2 * | 9/2005 | Daizen | 701/425 |
| 7,054,745 B1 | 5/2006 | Couckuyt et al. | |
| 7,065,448 B1 | 6/2006 | Gearhart | |
| 7,135,994 B2 | 11/2006 | Kamikawa et al. | |
| 7,260,474 B1 | 8/2007 | Thayathil et al. | |
| 7,395,153 B1 | 7/2008 | Nesbitt et al. | |
| 7,437,238 B2 * | 10/2008 | Monde et al. | 701/425 |
| 7,474,960 B1 * | 1/2009 | Nesbitt | 701/533 |
| 7,584,412 B1 * | 9/2009 | Raff | 715/203 |
| 7,599,795 B1 | 10/2009 | Blumberg et al. | |
| 7,612,919 B2 | 11/2009 | Takahashi | 358/400 |
| 7,636,886 B2 * | 12/2009 | Wyle et al. | 715/277 |
| 7,706,973 B2 | 4/2010 | McBride et al. | |
| 7,913,179 B2 | 3/2011 | Sheha et al. | |
| 2002/0049533 A1 | 4/2002 | Kusano et al. | |
| 2002/0054123 A1 * | 5/2002 | Walden et al. | 345/781 |
| 2002/0055952 A1 * | 5/2002 | Clancey et al. | 707/504 |
| 2002/0073121 A1 * | 6/2002 | Sano et al. | 707/517 |
| 2002/0099740 A1 * | 7/2002 | Patrick | 707/526 |
| 2002/0120397 A1 | 8/2002 | Kepler | |
| 2002/0154174 A1 | 10/2002 | Redlich et al. | |
| 2003/0038835 A1 * | 2/2003 | DeFelice | 345/738 |
| 2003/0107749 A1 | 6/2003 | Aquilina | |
| 2003/0128139 A1 | 7/2003 | Poltorak | |
| 2003/0158651 A1 | 8/2003 | Matsuo et al. | |
| 2003/0182052 A1 | 9/2003 | DeLorme et al. | |
| 2003/0191578 A1 | 10/2003 | Paulauskas et al. | |
| 2004/0204840 A1 | 10/2004 | Hashima et al. | |
| 2004/0243929 A1 * | 12/2004 | Jones et al. | 715/509 |
| 2004/0254723 A1 | 12/2004 | Tu | |
| 2005/0182564 A1 | 8/2005 | Kim | |
| 2005/0195096 A1 * | 9/2005 | Ward et al. | 340/995.14 |
| 2005/0197763 A1 | 9/2005 | Robbins et al. | |
| 2005/0256844 A1 * | 11/2005 | Cristol | 707/2 |
| 2005/0270311 A1 | 12/2005 | Rasmussen et al. | |
| 2005/0288859 A1 | 12/2005 | Golding et al. | |
| 2006/0064241 A1 | 3/2006 | Rasmussen et al. | |
| 2006/0066608 A1 * | 3/2006 | Appolloni | 345/419 |
| 2006/0069503 A1 | 3/2006 | Suomela et al. | |
| 2006/0089792 A1 | 4/2006 | Manber et al. | |
| 2006/0178826 A1 | 8/2006 | Gomi | |
| 2007/0032947 A1 | 2/2007 | Yamada et al. | |
| 2007/0050340 A1 | 3/2007 | von Kaenel et al. | |
| 2007/0078596 A1 | 4/2007 | Grace | |
| 2007/0083428 A1 | 4/2007 | Goldstein | |
| 2007/0162474 A1 * | 7/2007 | Parupudi et al. | 707/100 |
| 2008/0147314 A1 * | 6/2008 | Cubillo | 701/207 |
| 2008/0255849 A9 * | 10/2008 | Gustafson | 704/275 |
| 2009/0118995 A1 * | 5/2009 | Zhao et al. | 701/117 |
| 2010/0057347 A1 * | 3/2010 | Sugiyama et al. | 701/204 |
| 2010/0217514 A1 * | 8/2010 | Nesbitt | 701/200 |

OTHER PUBLICATIONS

American Map Road Atlas 2005 United States: Large Scale Large Type (Spiral-Bound); Publisher: American Map (Aug. 2004); Language: English; ISBN-10: 0841625174; ISBN-13: 978-841625174, p. 1.

* cited by examiner

DRIVING DIRECTIONS WITH SELECTIVE PRINTING

BACKGROUND INFORMATION

Computerized applications have been developed for generating and providing driving directions in response to user requests. For example, a user may access a conventional driving direction application, identify a starting location and a destination location, and receive in return driving directions descriptive of a driving route between the locations.

Many traditional driving direction applications allow a user to print a set of generated driving directions for future reference. However, these applications do not provide a user with control over the information that is printed. For example, a user may find it undesirable to print certain driving steps included in driving directions, including steps instructing the user how to navigate a familiar route. Examples of unhelpful driving steps include steps that direct the user how to get from his or her residence to a nearby freeway onramp that is familiar to the user. Because of the limited printing features provided by conventional driving direction applications, the user will have to include all of the driving steps in a printout of the driving directions. Consequently, traditional driving direction applications typically lead users to print entire sets of directions, which unnecessarily wastes time, ink, and toner, clutters the printed output, and frustrates the user.

Some users have found a way to use a web browser feature to print only a selected section of driving directions. This feature, referred to as the "print selection" feature of a web browser, allows a user to select and print a section of text displayed in a web browser. With this feature, a user is able to highlight a section of text and select the "print selection" feature to print the selected section of text. Unfortunately, web browser print selection features have several disadvantages. For example, only a continuous section of text can be selected, meaning that only one group of consecutive driving steps can be printed together. Moreover, the layout of a web page may force a user to select and print unwanted graphics or advertisements along with desired text. Further still, some users may use web browsers that do not provide a "print selection" feature. Even for users of web browsers that do provide a "print selection" feature, a large portion of these users are not aware that such a feature is provided in web browsers. Thus, the "print selection" feature of a web browser does not provide flexible or satisfactory control over the printing of driving directions.

For at least these reasons, there is a need for systems and methods that provide users with additional control over the printing of driving directions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Preferred embodiments may be implemented as systems and methods for selectively printing driving directions. The systems and methods provide computer-generated driving directions and one or more tools by which users can selectively print a subset of the driving directions, as described below. The tools enable users to customize driving direction printouts. For example, exemplary tools described herein enable users to select specific driving direction steps for printing. In certain embodiments, the tools enable users to select, for each driving step in the driving directions, between including the driving step in and omitting the driving step from a printing. In certain embodiments, the tools enable users to select non-consecutive driving direction steps for printing. In certain embodiments, the tools also enable users to select which driving direction steps are displayed in a graphical user interface.

The tools described herein provide users with significant and user-friendly control over driving direction information. In many situations, not every step included in driving directions is helpful for users, and the capability to control the driving direction information that will be included in printouts enables users to customize the printouts. For example, users can omit certain driving steps from driving direction printouts, thereby reducing printout clutter and increasing the relevance of the information in the printouts to the users. The omission of unhelpful information from driving direction printouts can help drivers using the printouts to more easily find relevant information on the printouts. This can reduce the distractions and stresses associated with navigating unfamiliar driving routes.

Moreover, increased control over driving direction print information provides users with an attractive feature that can help differentiate one driving direction application from another. This differentiation may help increase revenues associated with a driving direction application employing the features described herein.

Components and functions of exemplary embodiments of systems and methods for selectively printing driving directions will now be described in detail.

II. Exemplary System View

Figure 1:
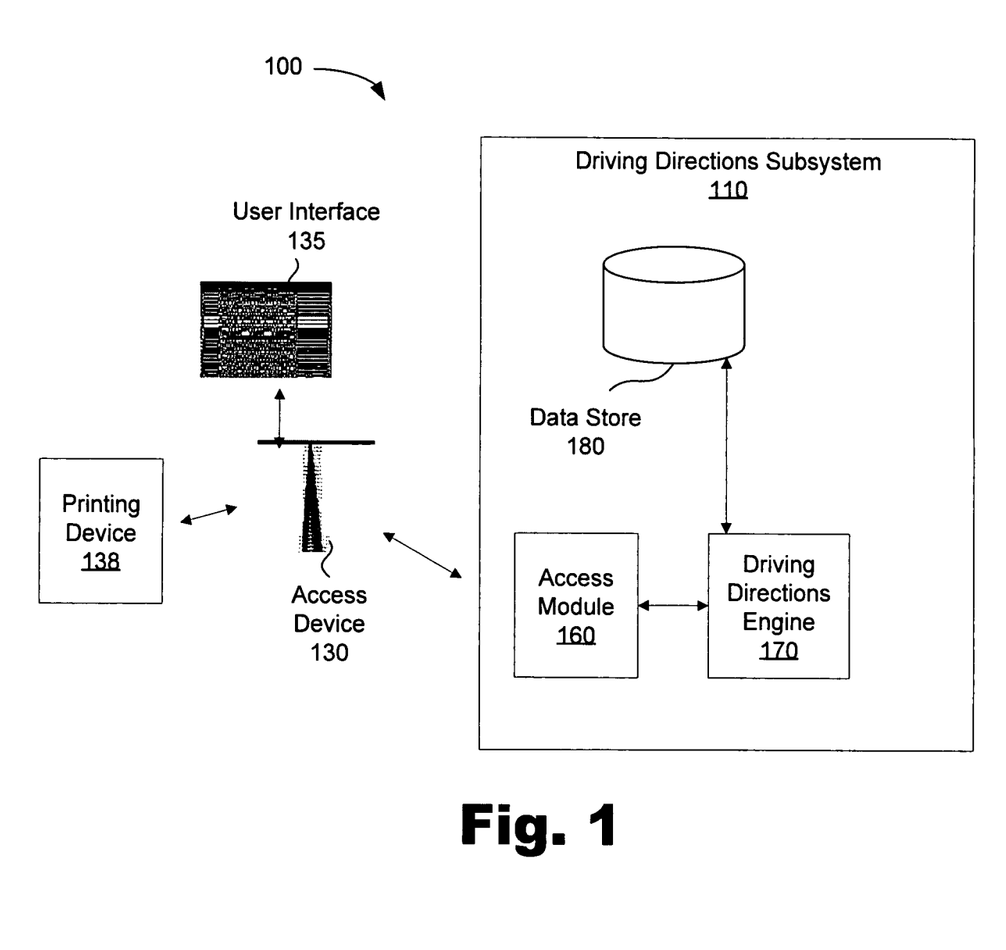
FIG. 1 is a block diagram illustrating an exemplary system for selectively printing driving directions, according to an embodiment.

FIG. 1 illustrates an example of a system 100 for selectively printing driving directions, according to an embodiment. As shown in FIG. 1, the system 100 may include a driving directions subsystem 110 configured to communicate with an access device 130 that is configured to present a user interface 135 for consideration by a user of the access device 130. The access device 130 is communicatively coupled to and configured to provide printing instructions and data to a printing device 138. The driving directions subsystem 110 includes an access module 160, driving directions engine 170, and data store 180.

The elements of the system 100 may communicate using any known communication technologies, devices, media, and protocols supportive of data communications, including, but not limited to, the Internet, the World Wide Web, intranets, local area networks, wide area networks, cellular telephone networks, wireless networks, optical fiber networks, satellite networks, telephone networks, other communications networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, data bus technologies, and other suitable communications technologies. In certain embodiments, the access device 130 and the driving directions subsystem 110 communicate with one another via a communication network, which may include, but is not limited to, any of the networks listed above (e.g., the Internet).

In certain embodiments, the elements of the system 100 are implemented in one or more computers. The system 100 may include any computer hardware and/or instructions (e.g., software and firmware programs), or combinations of software, firmware, and hardware, configured to perform the processes described herein. In particular, it should be understood that the driving directions subsystem 110 may be implemented on one or more than one physical computing device. Accordingly, the system 100 may include any one of a number of well-known computing devices (e.g., one or more servers), and may employ any of a number of well-known computer operating systems, including, but by no means limited to, known versions and/or varieties of the Microsoft Windows® operating system, the Unix operating system, and the Linux operating system.

Accordingly, the processes described herein may be implemented at least in part as instructions executable by one or more computing devices, as is well known. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Indeed, other alternative hardware environments and implementations may be used, as is well known. Each of the components of the system 100 will now be described in additional detail.

A. Access Device

The access device 130 may include any device physically or remotely accessible to one or more users (e.g., users requesting driving directions from the driving directions subsystem 110) and that allows a user to provide input to and receive output from the driving directions subsystem 110. For example, the access device 130 can include, but is not limited to, one or more desktop computers, laptop computers, tablet computers, personal computers, kiosks, personal data assistants, cellular telephones, satellite pagers, wireless internet devices, embedded computers, video phones, network interface cards, mainframe computers, mini-computers, programmable logic devices, vehicles, personal communication devices, and any other devices capable of communicating with the driving directions subsystem 110. The access device 130 can also include various peripherals such as a terminal, keyboard, keypad, mouse, screen, printer, stylus, input device, output device, or any other apparatus that can help a user interact with the access device 130.

The access device 130 may be communicatively coupled to the driving directions subsystem 110 using any suitable communication technologies, including any of the communication technologies listed above. In certain embodiments, the access device 130 and the driving directions subsystem 110 are configured to communicate via the Internet or World Wide Web, as is well known.

The access device 130 provides access to the driving directions subsystem 110. Accordingly, one or more users may utilize the access device 130 to provide requests to and receive output from the driving directions subsystem 110. In particular, users are able to use the access device 130 to provide requests for driving directions to the driving directions subsystem 110. The requests may include data representative of one or more geographic locations or areas, including a starting location and a destination location. The locations may be identified by street addresses, city identifiers, state identifiers, territory identifiers, zip codes, airport codes, Global Positioning System coordinates, other suitable location identifiers, or any combination thereof, as is well-known.

Output from the driving directions subsystem 110 may be provided to the access device 130. Examples of driving directions generated and outputted by the driving directions subsystem 110 are described further below. The access device 130 can present the driving directions and related information in the user interface 135 for consideration by the user of the access device 130.

The access device 130 may include instructions for generating and operating the user interface 135. The instructions may be in any computer-readable format, including software, firmware, microcode, and the like. When executed by a processor (not shown) of the access device 130, the instructions may present the user interface 135 to a user of the access device 130, as is well known.

The access device 130 may include instructions for communicating with the printing device 138, including instructions for printing select driving directions and/or other data. The instructions may be in any computer-readable format, including software, firmware, microcode, and the like. When executed by a processor (not shown) of the access device 130, the instructions may generate and provide printing instructions to the printing device 138, as is well known.

While FIG. 1 shows a single access device 130, this is only illustrative. One or more access devices 130 may communicate with and benefit from messages and/or data provided by the driving directions subsystem 110.

B. User Interface

The access device 130 may present the user interface 135 to a user as a way for the user to initiate communications with and/or consider output from the driving directions subsystem 110. The user interface 135 may be equipped to present information to and receive input from users. As described below, for example, the user interface may present driving directions and tools for controlling the printing of the driving directions to a user of the access device 130.

The user interface 135 may comprise one or more graphical user interfaces ("GUI") capable of displaying information and receiving input from users. In certain exemplary embodiments, the user interface 135 includes a web browser, such as Internet Explorer® offered by Microsoft Corporation of Redmond, Wash.

However, the user interface 135 is not limited to a web form embodiment and may include many different types of user interfaces that enable users to utilize the access device 130 to communicate with the driving directions subsystem 110. In some embodiments, for example, the user interface 135 may include a voice interface capable of receiving input from and providing output to a user. Merely by way of example, the user interface 135 may include voice recognition applications. Accordingly, users may be able to provide requests and receive corresponding driving directions in audio format. Driving directions in audio format can be especially beneficial to users who do not want to read driving directions while driving.

C. Printing Device

The printing device 138 is communicatively coupled to the access device 130 and may include any device or combination of devices or communication technologies useful for communicating with the access device 130. Communications between the access device 130 and the printing device 138 may be supported by any suitable communications technologies, including, but not limited to, one or more wired and/or wireless connections, protocols and interfaces such as Universal Serial Bus ("USB"), IEEE 1394, IEEE 802.11, Bluetooth, serial interfaces, parallel interfaces, and Ethernet connections. The printing device 138 may be located proximate to the access device 130 or at a remote location. The printing device 138 may be separate from or integrated with the access device 130.

The printing device 138 may include any technologies helpful for recording electronic data on paper or other suitable medium, as is well known. In particular, the printing device 138 can print data received from the access device 130, including data representative of driving directions. The printing device 138 may include an inkjet printer, laser printer, or other known device for printing electronic data.

The printing device 138 is not limited to printing electronic data to paper or similar media. In certain embodiments, for example, the printing device 138 may alternatively or additionally be configured to provide (i.e., print) data to a display screen, such as a navigation display in a vehicle.

D. Driving Directions Subsystem

The driving directions subsystem 110 may include any device or combination of devices and communication technologies useful for communicating with the access device 130. The driving directions subsystem 110 may also include any device or combination of devices and data storage and processing technologies useful for storing and processing data, including data useful for generating driving directions. The components of the driving directions subsystem 110 will now be described.

1. Data Store

The data store 180 may include one or more data storage mediums, devices, or configurations and may employ any type, form, and combination of well-known storage media, including hard disk drives, read-only memory, caches, databases, optical media, and random access memory. Data store 180 may include any known technologies useful for storing, updating, modifying, accessing, retrieving, deleting, and managing data.

The data store 180 may store any data useful for the generation of driving directions. For example, the data store 180 may include Geocode data, map data, addresses, listings, and other driving directions data useful for generating driving directions, as is well known. The data stored in the data store 180 may be provided and/or maintained manually, automatically, or with a combination of manual and automatic steps.

Alternative or in addition to the data stored in the data store 180, the driving directions subsystem 110 may use data from external sources to generate driving directions.

2. Driving Directions Engine

The driving directions engine 170 is configured to receive and fulfill requests for driving directions, as is well known. The driving directions engine 170 typically receives such requests from the access module 160, which has received the requests from the access device 130, as described below. When a request for driving directions between two specified locations is received, for example, the driving directions engine 170 may query the data store 180 and/or one or more external sources for data useful for generating driving directions to fulfill the request. The output from the driving directions engine 170 may be in any suitable data format(s) and may include any acceptable representation of driving directions. The generated driving directions may include, but are not limited to, textual, audible, visual (e.g., maps), and other suitable representations of driving routes and related information. Examples of driving directions will be described below in relation to FIGS. 2 through 4.

3. Access Module

The access module 160 may include any suitable communication technologies for communicating with the driving directions engine 170 and the access device 130. In certain embodiments, the access module 160 includes or is implemented in one or more servers configured to communicate with the access device 130. The communications between the access module 160 and the access device 130 may be transmitted over any suitable communication network, including the Internet or the World Wide Web, as is well known.

The access module 160 may be configured to receive from the access device 130 data representative of requests for driving directions, as described above. The requests may be forwarded from the access module 160 to the driving directions engine 170, which generates responses to the requests, as described above. The responses generally include driving directions that have been generated based on information includes in the requests.

The access module 160 is configured to receive output (e.g., the responses to the requests) from the driving directions engine 170. The access module 160 processes the output, including ensuring that it is in suitable form for transmission to the access device 130. For example, the access module 160 may be configured to insert the output, including the driving directions, into Hypertext Markup Language ("HTML") messages for transmission to the access device 130 using Hypertext Transport Protocol ("HTTP"). Of course, other suitable data formats and protocols may be used.

In certain embodiments, the output generated by the driving directions engine 170 includes one or more tools that, when provided to the access device 130, enable a user of the access device 130 to select a subset of the driving directions for printing. In certain other embodiments, the access module 160 is configured to associate one or more tools with the driving directions output by the driving directions engine 170. The access module 160 may insert the driving directions output and the associated one or more tools into HTML messages that can be transmitted to the access device 130, which is able to present the content of the HTML messages in the user interface 135 for consideration by a user. Of course, other suitable types of data messages may be used. Accordingly, the access module 160 is able to provide data representative of driving directions and one or more associated tools to the access device 130.

The access device 130 is configured to receive and present the data representative of the driving directions and tools for consideration by a user. As described below, the tools enable users to select a subset of the driving directions for printing. The driving directions and tools may be presented in one or more graphical user interfaces for consideration by users.

Figure 2:
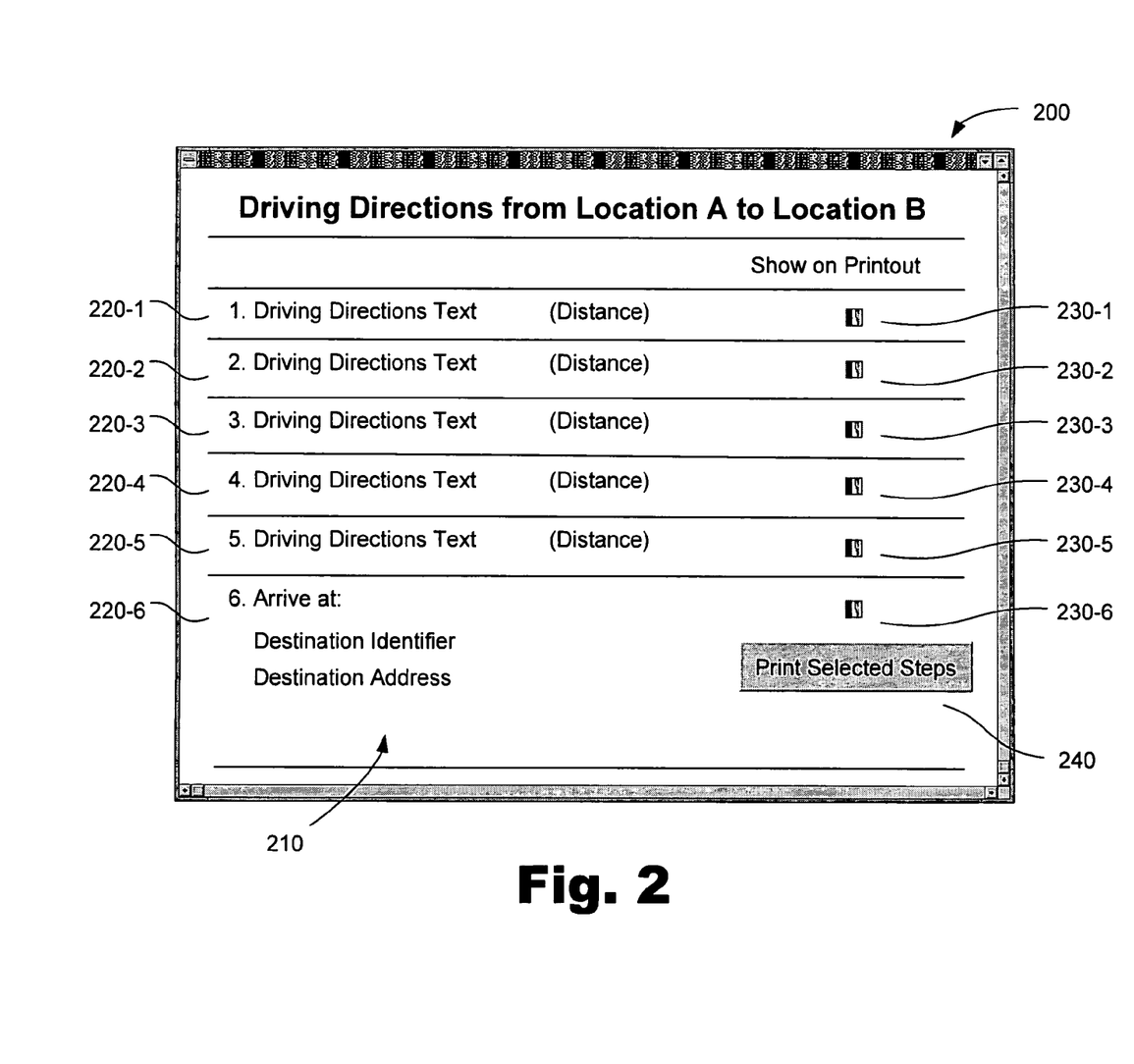
FIG. 2 illustrates an exemplary graphical user interface window presenting selection tools for selectively printing driving directions, according to an embodiment.

FIG. 2 illustrates an exemplary graphical user interface ("GUI") window 200 that may be presented in the user interface 135. As shown in FIG. 2, the GUI window 200 may include driving directions 210 having one or more driving direction steps 220-1 through 220-6 (referred to collectively as "the driving direction steps 220" or simply "the driving steps 220"). Each of the driving direction steps 220 may include a textual description of a driving instruction, as is well known.

The GUI window 200 also includes one or more selection tools, shown as selection tools 230-1 through 230-6 (referred to collectively as "the selection tools 230") in FIG. 2. Each selection tool 230 is selectable by a user of the access device 130, and enables the user to select between including driving direction steps in or omitting driving direction steps from a printing of driving directions. In FIG. 2, each of the selection tools 230 is associated with a corresponding one of the driving steps 220. For example, selection tool 230-1 is associated with driving step 220-1 and enables the user to select whether to include or omit driving step 220-1 in/from a printout. Accordingly, the selection tools 230 enable the user to select, on an individual basis, each driving step 220 to be included in and each driving step 220 to be omitted from a printing. Alternatively, each driving step may be pre-selected and the user may then deselect each driving step 220 not to be included in a printing. This provides the user with significant control and flexibility for customizing printouts, including a capability for selecting non-consecutive driving steps for inclusion in a printing and/or a capability for unselecting non-consecutive driving steps for exclusion from a printing. The capability for selecting non-consecutive driving steps enables the user to select for printing only the driving steps that involve making a turn, for example.

The selection tools 230 may be configured to selection statuses for the driving direction steps 220. Accordingly, the selection tools 230 can indicate which, if any, of the driving steps 220 is currently selected for printing (i.e., "selected status") and which, if any, of the driving steps 220 is currently not selected (i.e., "unselected status") for printing. In FIG. 2, the selection tools 230 include check boxes. However, any other suitable status indicators may be used, including the "+" and "−" symbols shown in FIG. 3.

The driving directions subsystem 110 may also provide a print control tool such as the print control tool 240 illustrated in the GUI window 200 as a button entitled "Print Selected Steps." The print control tool 240 allows a user to initiate a printing of the driving steps 220, including any subset of the driving steps 220, associated with currently selected selection tools 230. Typically, the printing will be performed by printing device 138. In FIG. 2, none of the selection tools 230 is selected for printing. Consequently, none of the driving steps 220 would be printed if a user of the access device 130 selected the print control tool 240.

Figure 3:
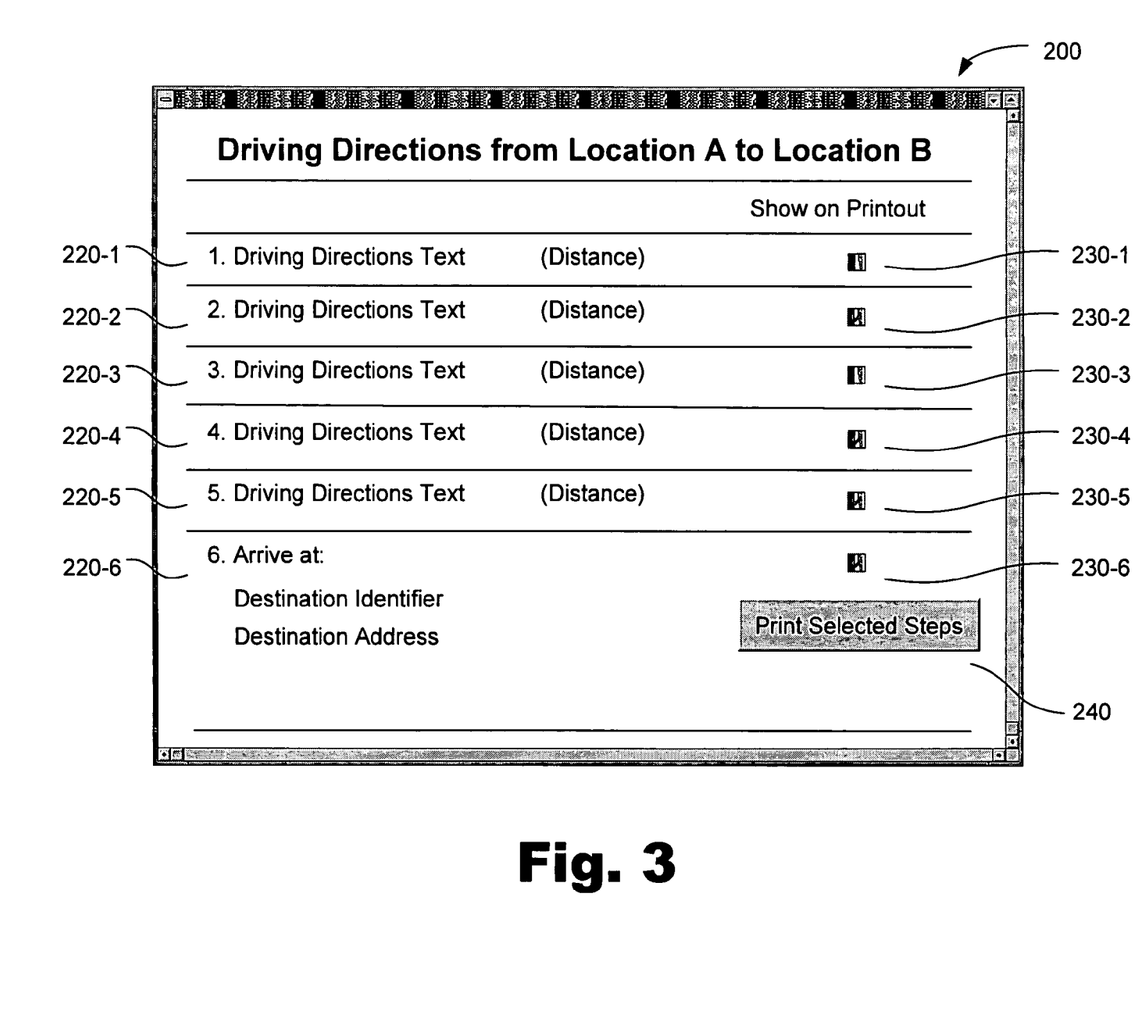
FIG. 3 illustrates the graphical user interface window of FIG. 2 with certain driving steps selected for printing, according to an embodiment.

FIG. 3 illustrates the GUI window 200 of FIG. 2 with certain ones of the selection tools 230 having been selected by the user. As shown in FIG. 3, several of the selection tools 230 are selected and others of the selection tools 230 are not selected. As shown, the selection tools 230 enable the user to select non-consecutive ones of the driving steps 220 (e.g., driving step 220-2 and driving step 220-4 are non-consecutive) for printing. If the print control tool 240 is selected with the selection statuses as shown in FIG. 3, driving steps 220-2, 220-4, 220-5, and 220-6 will be printed, and driving steps 220-1 and 220-3 will be excluded from the printing.

In certain embodiments, the driving directions 210, selection tools 230 and the print control tool 240 are included in a single GUI window 200. This helps increase the user-friendliness and user awareness of the selective print features provided by the system 100. For example, because the selection tools 230 and the print control tool 240 are included in a single GUI window 200, it is more convenient for the user to print selected driving steps 220 as compared to using a standard web browser to print a selection. Moreover, users using web browsers not having a "print selection" feature and users who are unaware that their web browsers provide such a feature, limited though it is as discussed above, are made aware of and are able to utilize the tools in the GUI window 200 to selectively print driving directions.

The system 100 may provide users with other suitable tools for selectively controlling the printing of driving directions. For example, the driving directions subsystem 110 may provide the access device 130 with a tool for selecting multiple driving direction steps 220 at once and/or a tool for selecting a certain category of driving direction steps 220, such as only the driving steps indicating turns. The driving directions subsystem 110 may also be configured to provide users with an option for adjusting the format and size of driving steps 220 according to user preferences. Additionally, a user may be provided with a tool for saving preferences, driving direction results, or driving direction locations for future use.

Figure 4:
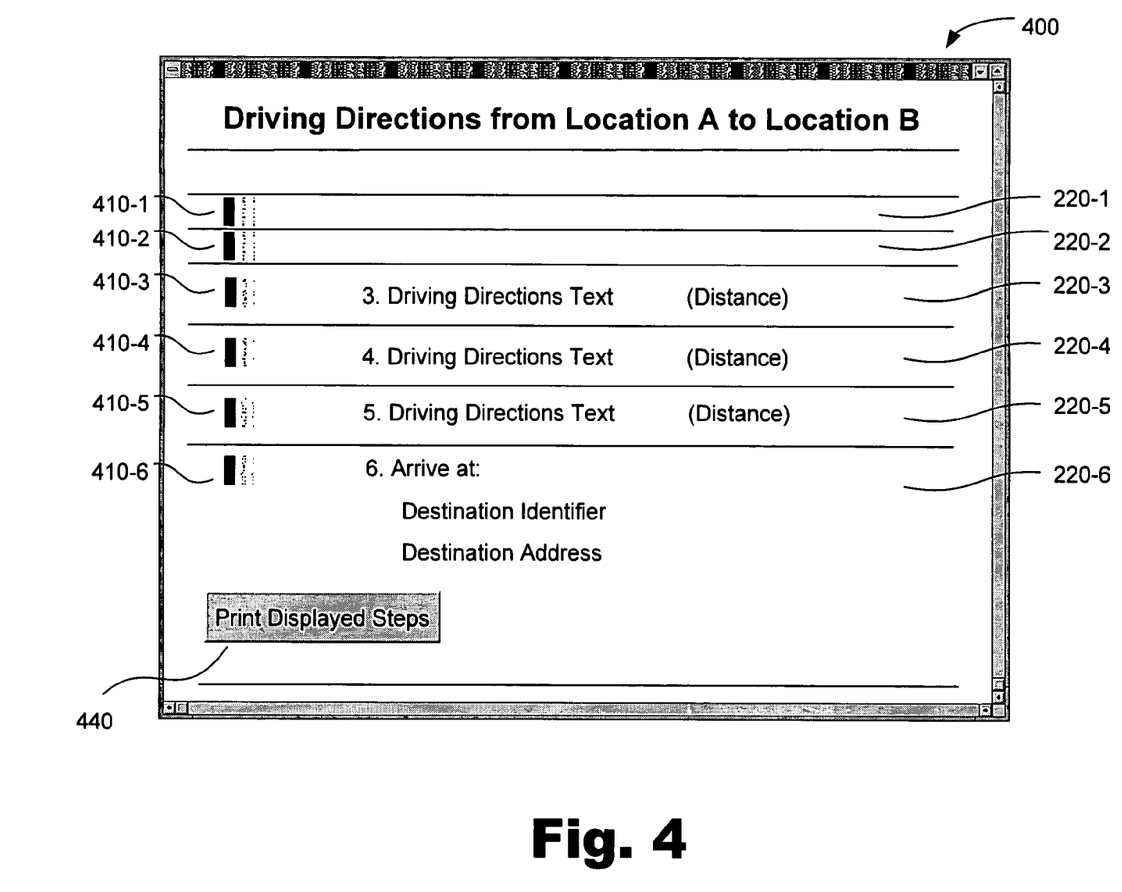
FIG. 4 illustrates another exemplary graphical user interface window presenting other exemplary selection tools for selectively printing driving directions, according to an embodiment.

Other suitable selection tools may be provided by the system 100. FIG. 4 illustrates another exemplary graphical user interface ("GUI") window 400 that may be presented in the user interface 135. As shown in FIG. 4, the GUI window 400 may include the driving direction steps 220-1 through 220-6 associated with selection tools 410-1 through 410-6 (referred to collectively as "the selection tools 410"). The selection tools 410 enable a user to select one or more of the driving direction steps 220 for printing and for display in the GUI 400. As illustrated, the selection tools 410 may be toggled (i.e., selected and unselected) to either display or hide corresponding driving steps 220 in the GUI window 400. As shown in FIG. 4, selection tools 410-1 and 410-2 are unselected such that driving steps 220-1 and 220-2 are hidden from view, and selection tools 410-3 through 410-6 are selected such that driving steps 220-3 through 220-6 are displayed. Accordingly, the selection tools 410 enable a user to view, prior to printing, the driving direction steps 220 as they would be printed when a print control tool 440 is selected. The print control tool 440 is included in the GUI window 400 and is represented in FIG. 4 by a selectable button labeled "Print Displayed Steps," indicating that the currently displayed steps would be printed when the print control tool 440 is activated.

The tools described above enable users to customize printed driving directions to fit specific user preferences and situations. The tools allow users to select for printing only the most useful information for navigating driving routes, while excluding unhelpful and/or less helpful steps from the printing. Drivers can use customized driving direction printouts to quickly find information without having to browse through superfluous or distracting information. This can help reduce the stresses, distractions, and potential dangers associated with using printed driving directions when navigating unfamiliar routes.

III. Exemplary Process View

Figure 5:
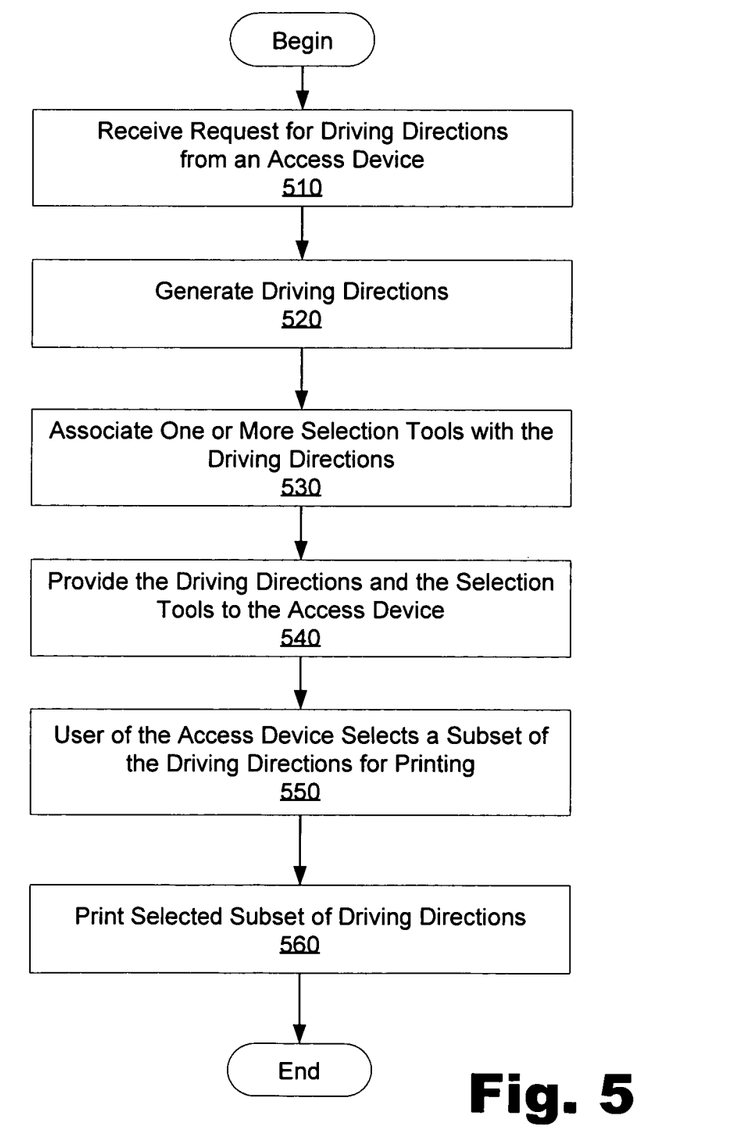
FIG. 5 is a flowchart illustrating an exemplary process for selectively printing driving directions, according to an embodiment.

FIG. 5 is a flowchart illustrating an exemplary process for selectively printing driving directions, according to an embodiment. While FIG. 5 illustrates exemplary steps according to one embodiment, other embodiments may omit, add to, reorder, and/or modify any of the steps shown in FIG. 5.

In step 510, a request for driving directions is received from an access device such as the access device 130. Step 510 may be performed in any of the ways described above, including the driving directions subsystem 110 receiving the request from the access device 130.

In step 520, driving directions are generated. The driving directions are generated based on and in response to the request. Step 520 may be performed in any of the ways described above. For example, the driving directions engine 170 may use data in the data store 180 to generate driving directions, as described above.

In step 530, one or more selection tools are associated with the driving directions. Step 530 may be performed in any of the ways described above, including the access module 160 or the driving directions engine 170 associating a selection tool with each driving step included in the driving directions.

In step 540, the driving directions and the selection tools are provided to the access device for consideration by the user. Step 540 may be performed in any of the ways described above. For example, data representative of the driving directions and the selection tools may be inserted into one or more messages (e.g., HTML messages) that are then transmitted to the access device 130. The access device can present the driving directions and selection tools in a user interface (e.g., the user interface 135) for consideration by the user of the access device 130. As described above, the selection tools enable the user to select a subset of the driving directions for printing.

In step 550, the user of the access device selects a subset of the driving directions for printing. Step 550 may be performed in any of the ways described above. For example, the user of the access device 130 can utilize any of the tools described above to manage the information presented in the driving directions, including using selection tools to select certain driving steps for printing and activating a print control tool to initiate the printing.

In step 560, the selected subset of driving directions is printed. Step 560 may be performed in any of the ways described above, including the access device 130 transmitting a printing request and data representative of selected driving steps to the printing device 138. The printing device 138 then prints the selected driving steps.

The above-described systems and methods provide tools for selectively printing driving directions. The tools allow users to customize the information included in printed driving directions as may fit specific user preferences and situations. These and other features of the present systems and methods can help reduce the distractions and stresses associated with using printed driving directions when navigating unfamiliar driving routes.

In another embodiment, the systems and methods described above may be applied to deal with the constraints of mobile devices that provide limited viewing areas. For example, access devices such as mobile phones, personal digital assistants (PDAs) and other mobile video-enabled devices are known which may be connected to, for example, wireless data networks which provide connectivity to a driving directions subsystem (such as driving directions subsystem 110). These devices typically include displays that are reduced in size for various reasons (e.g., size constrains, power constraints, cost constraints). However, due to their mobile nature, may be useful to provide driving directions which can be carried with the user, and may be more convenient than printed directions (which require access to a printing device).

Applying the descriptions provided above, the GUI windows illustrated in FIGS. 2-4 may be displayed on a mobile access device. In such display, the "Print Selected Steps" option (FIGS. 2 and 3) or "Print Displayed Steps" option (FIG. 4) may be omitted, or replaced by a control that removes those steps indicated by the user to be omitted from the display (e.g., a "Remove Selected Steps" control). In this manner, only those steps indicated by the user to be useful for navigation purposes may be displayed on the screen, thus allowing for better use of the limited space of mobile device displays.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A method comprising:
providing data representative of driving directions to an access device, said driving directions including a plurality of driving steps;
providing at least one selection tool to the access device, each said at least one selection tool associated with one of said plurality of driving steps and enabling a user of the access device to select a category of driving steps, said category selecting which of said driving steps to display and hide in a graphical user interface; and
displaying, in said graphical user interface, for each of said at least one selection tool, a selection status indicator that indicates whether the associated one of said plurality of driving steps associated with the selection tool is selected for printing, said selection status indicator being based on whether said associated one of said plurality of driving steps is selected for display in said graphical user interface;
wherein said data representative of said driving directions and said at least one selection tool are provided to the access device via a communication network.

2. The method of claim 1, said at least one selection tool enabling the user of the access device to select, for each of said driving steps, between including said driving step in and omitting said driving step.

3. The method of claim 2, said at least one selection tool enabling the user of the access device to select non-consecutive ones of said plurality of driving steps for inclusion.

4. The method of claim 1, further comprising providing a print control tool to the access device over the communication network, said print control tool enabling the user of the access device to initiate printing of said subset of said driving directions.

5. The method of claim 4, further comprising printing said subset of said driving directions when said print control tool is selected.

6. The method of claim 4, further comprising displaying said at least one selection tool, said print control tool, and said driving directions in a single graphical user interface window.

7. The method of claim 1, further comprising:
displaying each of said driving steps associated with a selected one of said at least one selection tool in said graphical user interface; and
hiding each of said driving steps associated with an unselected one of said at least one selection tool from view in said graphical user interface.

8. The method of claim 1, wherein said at least one selection tool includes a plurality of selection tools, the method further comprising associating each of said selection tools with a different one of said driving steps.

9. The method of claim 8, further comprising:
identifying at least one of said driving steps for inclusion when a first of said selection tools is selected, said first of said selection tools being associated with said at least one of said driving steps; and
identifying at least another of said driving steps for omission when a second of said selection tools is selected, said second of said selection tools being associated with said at least another of said driving steps.

10. The method of claim 9, further comprising:
displaying said at least one of said driving steps in a graphical user interface when said first of said selection tools is selected; and
hiding said at least another of said driving steps from view in said graphical user interface when said second of said selection tools is unselected.

11. The method of claim 1, wherein each of said driving steps includes a textual representation and wherein said selection tool enables the user of the access device to select between displaying and hiding the textual representation of each of said driving steps.

12. The method of claim 1, wherein said category of said driving steps includes driving directions indicating turns only.

13. The method of claim 1, wherein said at least one selection tool includes a category selection tool enabling said user of the access device to select said category of driving steps, said category of driving steps provided by a driving directions subsystem and configured to select multiple ones of said driving steps.

14. A method comprising:
providing data representative of said driving directions to an access device, said data being provided to the access device via a communication network, said driving directions including a plurality of driving steps;
providing at least one selection tool to the access device via the communication network, each said at least one selection tool associated with one of said plurality of driving steps and enabling the user of the access device to select a category of driving steps, said category selecting which of said driving steps to display and hide in a graphical user interface;
providing a print control tool to the access device over the communication network, said print control tool enabling the user of the access device to initiate said printing;
displaying said at least one selection tool, said print control tool, and at least a subset of said driving directions in a single graphical user interface window, wherein for each of said at least one selection tool, a selection status indictor for indicating whether the associated one of said plurality of driving steps associated with the selection tool is selected for printing, said selection status indicator enabling the user of the access device to select, for each of said driving steps, between displaying said driving step and hiding said driving step from view in the graphical user interface; and
printing selected ones of said driving steps when said print control tool is selected.

15. A method comprising:
receiving, at an access device, data representative of driving directions having a plurality of driving steps;
receiving a selection of at least one category of the driving steps from a user via at least one selection tool, each said at least one selection tool associated with one of said plurality of driving steps, said at least one category selecting which of said driving steps to display and hide and including less than all of the driving steps;
displaying, in a graphical user interface, for said at least one selection tool, a selection status indicator that indicates whether the subset of said driving instructions associated with the selection tool is selected for printing, said selection status indicator being based on whether the associated one of said plurality of driving steps is selected for display in said graphical user interface;
displaying the selected driving steps on the graphical user interface; and
hiding the non-selected driving steps from view on the graphical user interface.

16. The method of claim 15, further comprising printing the selected driving steps with a print control tool.

17. The method of claim 16, wherein the print control tool enables a user of the access device to initiate the printing of the selected driving steps.

18. The method of claim 15, wherein the selected driving steps includes non-consecutive driving steps.

* * * * *